June 23, 1925.
F. PUENING
HEATING APPARATUS
Filed Dec. 11, 1922
1,542,954
5 Sheets-Sheet 4
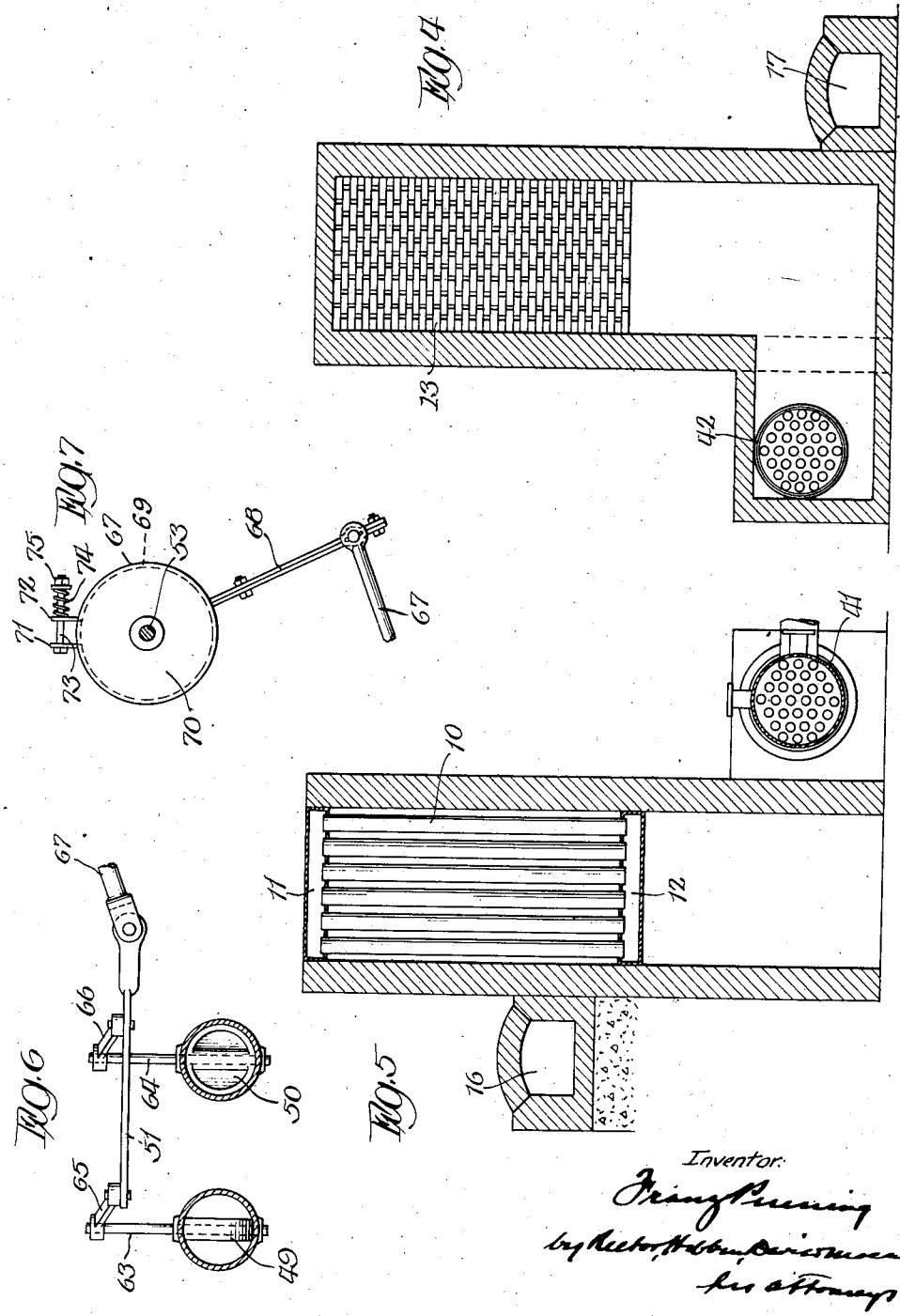

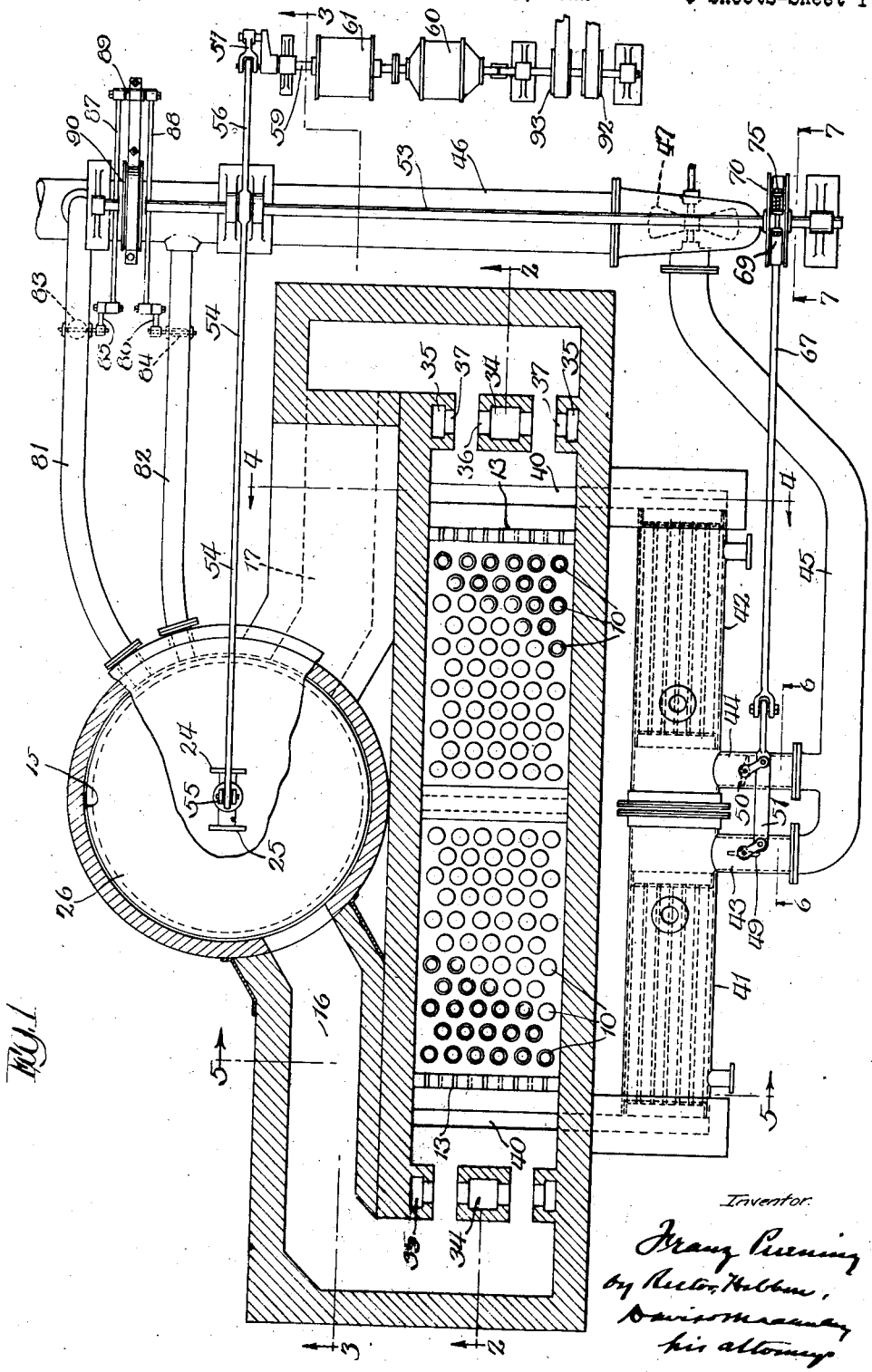

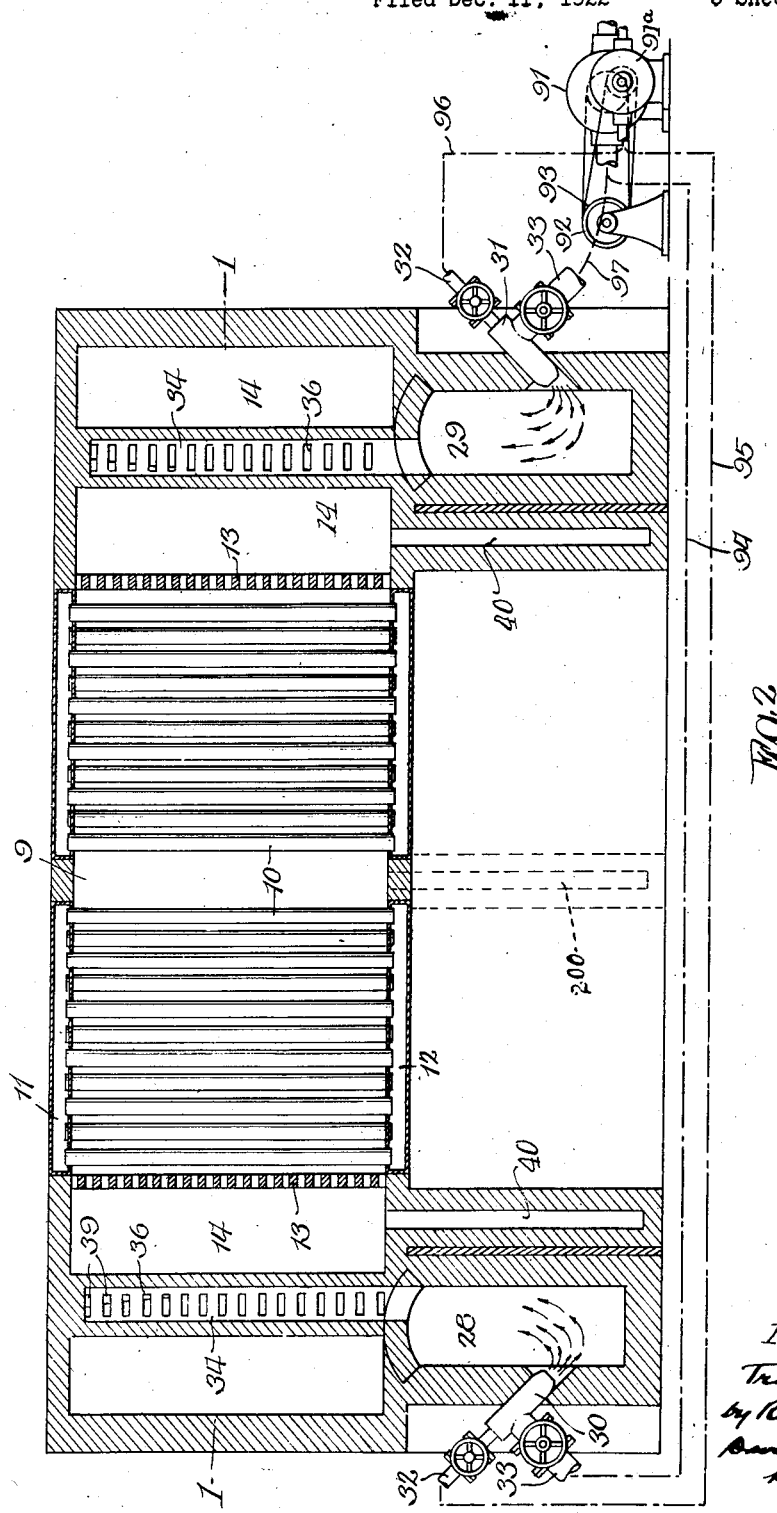

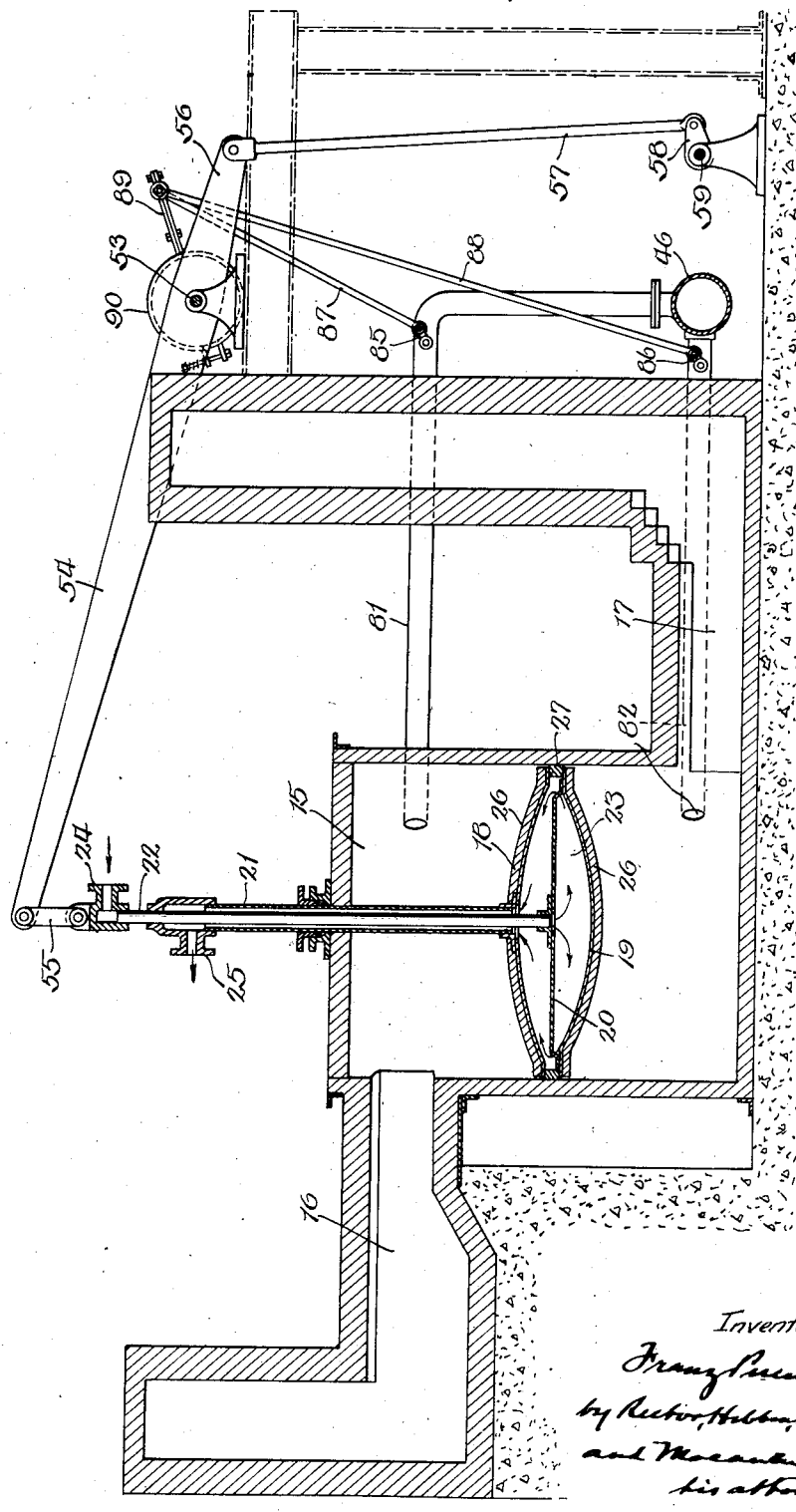

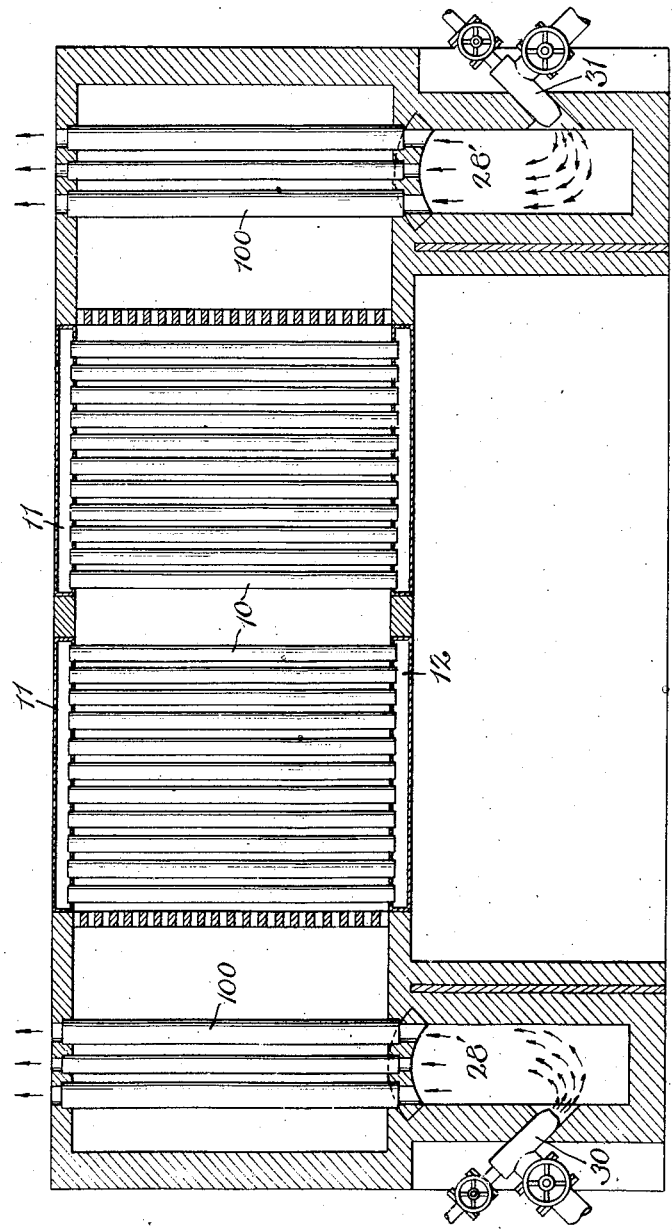

Patented June 23, 1925.

1,542,954

UNITED STATES PATENT OFFICE.

FRANZ PUENING, OF PITTSBURGH, PENNSYLVANIA.

HEATING APPARATUS.

Application filed December 11, 1922. Serial No. 606,037.

*To all whom it may concern:*

Be it known that I, FRANZ PUENING, a citizen of the United States, residing at Pittsburgh, in the county of Allegheny and State of Pennsylvania, have invented certain new and useful Improvements in Heating Apparatus, of which the following is a specification.

My invention relates to the heating art broadly and irrespective of the particular material or article heated. In some respects, it may be considered an improvement upon a similar device disclosed in an application Serial No. 396,693 heretofore filed by me to-wit, on the 16th day of July 1920. In the heating means of said earlier application the article to be heated is placed in a chamber through which a body of heating gases is passed alternately in opposite directions, its heat being maintained or augmented at each reversal of movement. The transfer of heat to the article or material being heated is rendered effective and uniform by the large volumes of gas brought in contact therewith due to the rapid motion of the heating gases through the heating chamber in two directions so that the same number of heat units may be imparted with the heating gases at much lower temperature than in the ordinary methods of heating heretofore employed. As, except for a small percentage, the same body of heated gas is employed throughout, and there is but little waste of heat, as in the usual heating process, by the escape of hot heating gases from the apparatus. In the present invention, the same general principle of operation is involved, but the apparatus is greatly improved in efficiency.
In the accompanying drawings forming a part of this specification, Figure 1 is a top plan view of the heating apparatus embodying my invention. parts being shown in horizontal plan on the line 1—1 of Fig. 2; Fig. 2 a vertical longitudinal section on the line 2—2 of Fig. 1; Fig. 3 a vertical section on the broken line 3—3 of Fig. 1; Fig. 4 a vertical section on the line 4—4 of Fig. 1; Fig. 5 a vertical section on the line 5—5 of Fig. 1; Fig. 6 a vertical section of the detail on the line 6—6 of Fig. 1; Fig. 7 a side elevation of a detail partly in vertical section on the line 7—7 of Fig. 1; and Fig. 8 a vertical section similar to that of Fig. 2 but of a somewhat modified construction. Each part is identified by the same reference character wherever it occurs in the several views.

In both forms of the invention illustrated, the invention is exemplified as applied to the heating of a fluid which may be water, oil or gas. The invention is particularly useful in connection with the heating of a material such as oil in which it is advantageous to provide as efficient a heat transfer as possible without danger of overheating such as exists where heating gases at high temperatures are employed.

Referring now to the preferred form of the device shown in Figs. 1 to 7, inclusive, it is seen to comprise a heating chamber 9 of masonry or brick work or other suitable material. I have shown a series of batteries of heating tubes 10 with suitable meanifolds 11, 12 mounted in this heating chamber for the purpose of illustration though as heretofore stated the invention is independent of the particular article or material heated. If the construction shown be used as a portion of a distilling system for oil, the headers will, of course, be connected up with suitable circulating and vaporizing apparatus.

At each end of the heating chamber is a perforated or reticulated diaphragm 13, the purpose of which is to assist in the even distribution of the heating gases as will more fully appear hereinafter and beyond the respective diaphragms are mixing chambers 14. The chambers 14, 14 are connected respectively to the opposite ends of a receiving chamber 15 which in the construction shown is vertically arranged, and the upper end thereof connected by ducts 16 to the left hand mixing chamber 14 and the lower end connected by duct 17 to the right hand mixing chamber. The receiving chamber 15 is preferably of a capacity at least equivalent to that of the heating chamber plus one mixing chamber and contains a reciprocating displacement member or piston 18. It will be apparent that when the piston moves from the uppermost position in the chamber 15 to the lowermost position, it displaces the gases occupying the chamber and forces them into the heating chamber and the body of gases theretofore in the heating chamber flows into the upper end of the receiving chamber 15. Upon the upward stroke of the piston, the reverse operation takes place, that is to say, the gases in the chamber above the piston are forced to flow through the heating chamber and the gases displaced from the latter flow into the receiving chamber beneath the piston. By reciprocating the piston continuously during the operation of the heater, the heating gases are caused to flow through the heating chamber alternately in opposite directions in contact with the article or material to be heated and by reason of their relatively large volume and rapid movement sweep away the dead gases and impinge directly upon the object or material heated in a manner which results in an efficient and uniform transfer of heat.

The piston is preferably cooled in a suitable manner to prevent its destruction by the hot gases in contact therewith, particularly where high temperatures are employed. In the particular construction shown, see Fig. 3, the piston is water cooled, the head 19 thereof being hollow and divided by a diaphragm 20. The piston rod 21 is tubular and communicates with the space in the piston above the diaphragm. An inner tube 22 extends through the tubular piston and communicates with the space 23 below the diaphragm and the latter is perforated around its periphery so as to afford communication between the upper and lower chambers. Connections 24, 25 are formed on the respective concentric tubes of the piston stem for supplying a cooling fluid to and exhausting it from the piston. Preferably the piston is provided as at 26 with a coating of refractory material.

The heater is formed at opposite ends thereof with combustion chambers 28, 29 provided respectively with burners 30, 31 which may be of any suitable construction, but are preferably gas or oil burners and provided with connections 32, 33 for gas or oil and air, respectively. The combustion chambers are connected by distributing flues 34, 35 with the respective mixing chambers. Flue 34 is arranged substantially centrally in the mixing chamber and is formed on its respective opposite sides with vertical series of lateral openings 36 by which the hot products of combustion coming from the combustion chambers are evenly distributed vertically in the mixing chamber. The side flues 35 are each formed with a vertical series of openings 37 directed toward the central flue which also assists in distributing the hot products of combustion from the combustion chambers into the mixing chamber. By reason of the tendency of the hot products of combustion to rise, it is necessary for even distribution vertically that the openings of the lower passages 36, 37 be somewhat freer than the openings of the upper passages and these openings may, therefore, be adjusted in any suitable manner as for example by suitably proportioned pieces of brick 39 which preferably are graduated in size as shown in Fig. 2.

At each reversal of the circulation through the heating chamber, a relatively small amount of the products of combustion from the respective combustion chambers is intermingled in this manner with the main body of heating gases forced to and fro through the heating chamber by the operation of a displacement device heretofore described. It is obviously essential to provide for the escape of a corresponding amount of the main body of gases. For this purpose, an outlet flue 40 opens into the mixing chamber at each end of the heater intermediate the diaphragm and the flues supplying the fresh products of combustion, and said exhaust flues are provided with suitable controlling dampers and communicate with a chimney flue or other passage for carrying away the products of combustion. In the specific form of the device chosen for exemplification of the invention, the outlet flues 40 communicate with heat exchangers 41, 42, respectively by which a substantial portion of the residual heat of the gases is absorbed. The absorbed heat may be utilized in any desired manner as for example for preheating the air and gas used for combustion. The gas passages of the respective heat exchangers are connected by branch flues 43, 44 respectively to the main outlet flue 45 which communicates with the chimney flue 46. A fan or blower 47 may be employed to create or assist to create a draft through these flues. Dampers or butterfly valves 49, 50 are installed in the respective branch flues 43, 44 and connected by a link 51 for joint operation by a mechanism which will now be described.

The main oscillating shaft 53 is mounted in suitable bearings transversely of the heater and at one end thereof an arm or lever 54 secured thereto is connected by a link 55 to the above described piston for reciprocating the latter (see Figs. 1 and 3). The shorter arm 56 of the lever is connected by a rod 57 with a crank arm 58 on a continuously rotating shaft 59. The shaft 59 may be driven by an electric motor 60 through a reducing gearing 61 of any suitable type so that as the motor revolves shaft 53 and lever 54 are slowly oscillated and the piston reciprocated. The shaft 53 is so connected to the valves 49, 50 in the branch outlet flues that the valves are shifted at the beginning of each alternate movement of said shaft. For this purpose, the respective valve shafts 63, 64 are provided with arms 65, 66 connected to link 51 to which reference has been made and the latter is connected by a rod 67 to an arm 68 which is oscillated by said shaft. The arm 68 is formed with a collar (Figs. 1 and 7) which embraces a friction sheave 70 on said shaft 53, the ends of the split collar being formed with lugs 71, 72 which receive a pin 73 and on the latter is a compression spring 74 mounted between lugs 72 and nut 75 of said pin so that the halves of the split collar are pressed into frictional contact with the sheave. It will thus be seen that at each reversal of the shaft the arm 68 moves therewith until the position of the valves is reversed and thereafter the further movement of the arm 68 is checked, the frictional connection described permitting the further movement of the shaft 53. Referring to Fig. 1, it will be noted that the construction is such that on each down stroke of the piston by which the heated gases contained in the receiver are driven to the right hand end of the heating chamber the valve 49 is immediately opened permitting the escape of a portion of the product of combustion which corresponds in volume substantially with the new products of combustion which are fed into and intermingled with the main body of gases coming from the receiver in the mixing chamber 14 at the right hand end of the furnace. At the same time, the valve 50 in the other branch conduit is closed. When the movement of the piston is reversed, the position of the valves is immediately reversed. At each reversal of flow of the gases through the heating chamber a small proportion of additional fresh hot products of combustion is added to the body of gases on its way to the heating chamber and a corresponding volume of the gases which have been more or less cooled by contact with the body or material to be heated is permitted to escape. It is thus possible to maintain the heating gases at any desired temperature.

In case the bulk of the heating gases are to be maintained at a very high temperature, such that the cooling means would carry away too much heat from the piston, I provide for reintroduction into the receiving chamber 15 above and below the piston of a small proportion of the exhaust gases from the chimney flue. Referring more particularly to Figs. 1 and 3, it will be observed that I have provided pipes 81, 82 leading from the chimney flue 46 to the chamber 15 at points respectively above and below the path of movement of the piston. Butterfly valves or dampers 83, 84 are mounted in these respective pipes and are operated from the shaft 53 by mechanism substantially like that described for the operation of valves 49, 50. Valves 83, 84 are provided with arms 85, 86 which are respectively connected by links 87, 88 to an arm 89 frictionally mounted upon a sheave on shaft 53. The connections are such that when the piston moves downward the valve in pipe 81 is opened and the valve in pipe 82 closed and on the upper movement of the piston the position of the valve is reversed. Thus a small amount of the relatively cool products of combustion is introduced at each stroke of the piston into contact therewith forming a cushion or buffer of relatively cool gases to protect the piston from the more highly heated body of heating gases.

The blowers for supplying gas or oil and air to the burners are operated by the electric motor which drives the previously described mechanism. For this purpose, the gas and air blowers 91ª, 91 are belted to pulleys 92, 93 on the shaft of the electric motor. The connections of the respective blowers to the burners are indicated in the dotted lines 94, 95, 96, 97. By reason of the driving connections described the supply of gas and air to the burners is linked to the operation of the piston and in the event of stoppage of the piston, the feed of air and gas is likewise terminated thus avoiding excessive heating.

In the form of the invention shown in Fig. 8, the heating gases are indirectly heated by contact with heating means and without the inter-mixture therewith of fresh highly heated products of combustion and the withdrawal of a portion thereof as in the construction just described. The heating chamber, combustion chambers and means for causing the flow of the heating gases alternately and in opposite directions through the heating chamber may be identical with what has been heretofore described in this specification. The hot products of combustion from the combustion chambers 28' in this latter embodiment of the invention are conducted through heating pipes 100 arranged in the path of the alternately opposite flow of heating gases at the respective ends of the heating chamber. From the heating tubes 100, the gases may be permitted to escape to the atmosphere or led away for further use. The heating gases before and after they enter the heating chamber circulate about the tubes 100 by which their temperature is raised to and maintained at the desired degree.

By my improved apparatus the same volume of gas is constantly used in transferring heat to the object to be heated, in the one case with no additions or subtractions therefrom whatever, and in the other case with only a very limited increment of fresh gases at each reversal accompanied by a corresponding withdrawal of used gases. Such used gases as are withdrawn have given off substantially their excess heat to the article being heated, so that even in this case but little heat is wasted. By causing the heating gases to sweep to and fro in the described manner in contact with the article to be heated a very efficient transfer of heat is effected, and a much smaller temperature differential between the heating gases and the article being heated is necessary to effect the same heat transfer than in the usual heating operation where the heating gases move much more slowly. Greater uniformity of heating without danger of overheating is therefore possible and the uniformity is assisted by the distribution of gases from the combustion chamber by the distributing flues, particularly in case the openings are adjusted as described, to compensate for the tendency of the hot gases to rise. The perforated diaphragm described not only assists in the distribution of the gases but also acts as a screen to prevent or minimize direct radiation from the hot distributing flues, thus further assisting in the uniform heating of the tubes or other articles contained in the heating chamber. Economy of heating is further enhanced by the fact that in this improved construction there are no cooling devices in contact with the heating gases and the construction is such that there is little opportunity for radiation and loss of heat in the passage of the gases to and from the heating chamber and receiver. Sufficient pressure is given to the air and gas supplied to the burner to overcome the very slight fluctuations of the pressure in the furnace due to the operation of the piston and receiver; or if desired by operating the fan in the outlet flue the pressure may be reduced to the desired extent to permit the entrance of the air and gas into the combustion chamber.

Obviously the combustion chambers may be dispensed with and hot gases introduced from some other source, or if desired a means for increasing the temperature of the heating gases may be dispensed with at one end of the device. Various other changes will suggest themselves to the skilled engineer. Thus by alternating the temperature-increasing means with heating chambers the device may be effectively multiplied.

I claim—

1. In a heating apparatus, a heating chamber, a receiving chamber, connections between the heating chamber and receiving chamber, movable means in the latter for displacing gases therefrom and forcing them into the heating chamber, a combustion chamber communicating with the heating chamber, an outlet flue also communicating with the heating chamber and means operated in synchronism with said movable means in the receiving chamber for closing said outlet flue when said movable means is operated to force the gas in the receiving chamber into said heating chamber.

2. In a device of the class described, a heating chamber, a gas receiving chamber, a flue connecting the two, movable means in the receiving chamber to force gas contained therein into the heating chamber, a combustion chamber, there being communication between said combustion chamber and flue, an outlet flue for a portion of the gases communicating with the connecting flue at a point between the heating chamber and the combustion chamber, a damper and means for closing the damper when the movable means in the receiving chamber is operated to force gases from the latter into the heating chamber.

3. In a device of the class described, a heating chamber, mixing chambers at the respective opposite ends of said heating chamber, a combustion chamber communicating with each said mixing chamber, an outlet flue communicating with each said mixing chamber, means for receiving heating gases alternately from opposite ends of the heating chamber and for returning them thereto.

4. In a device of the class described, a heating chamber, means connected to the respective opposite ends of the heating chamber for receiving gas alternately from said opposite ends of the heating chamber and returning it thereto, means for supplying additional gas to the opposite ends of said chamber, outlet flues connected to the respective opposite ends of said heating chamber and means for closing each outlet flue and opening the other with the reversal of the direction of the flow of the gases through the heating chamber.

5. In a device of the class described, a heating chamber, mixing chambers at the respective opposite ends thereof, a combustion chamber communicating with each said mixing chamber, an outlet flue connected with each said mixing chamber, means connected to each mixing chamber for receiving gas from said chamber and from the heating chamber and returning it thereto and valves for alternately opening and closing the respective outlet flues at each reversal of the flow of gases through the heating chamber.

6. In a device of the class described, a heating chamber, a receiving chamber connected to the respective opposite ends of the heating chamber and of approximately the capacity of the heating chamber, a piston in the receiving chamber adapted when moved in one direction to force the gas contained therein into the heating chamber from one end thereof and when moved in the other direction to force the gas contained in the receiving chamber into the heating chamber from the other end thereof, combustion chambers connected to the respective ends of the heating chamber, outlet flues connected to the said respective ends of the heating chamber, valves in said outlet flues and means for reversing said valves when the movement of the piston is reversed.

7. In a device of the class described, a heating chamber, a mixing chamber at each end thereof, a combustion chamber for each mixing chamber, flues extending from each combustion chamber into the mixing chamber and communicating therewith, outlet flues connecting with each mixing chamber, valves in the outlet flues, means connected with each mixing chamber for receiving gases therefrom and from the heating chamber, means for returning said gases to said mixing chamber and heating chamber and means for reversing the valve in each outlet flue adapted to close it when gases are returned to the mixing chamber with which it communicates.

8. In a device of the class described, a heating chamber, a receiving chamber of approximately the volume of the heating chamber, connections from the respective ends of the heating chamber to the respective ends of the receiving chamber, a piston reciprocating in the receiving chamber and adapted to force gases therefrom alternately to the opposite ends of the heating chamber, and means for circulating a cooling fluid through the piston.

9. In a device of the class described, a heating chamber, a receiving chamber of approximately the volume of the heating chamber, connections from the respective ends of the heating chamber to the respective ends of the receiving chamber, a piston reciprocating in the receiving chamber and adapted to force gases therefrom alternately to the opposite ends of the heating chamber, and heat insulating material covering said piston.

10. In a device of the class described a heating chamber, means for supplying heating gas to said chamber and withdrawing it therefrom alternately through the opposite ends thereof, means for supplying additional hot gas to the heating gas, flues at the respective ends of the heating chamber for withdrawing a portion of the heating gas substantially corresponding to the increment of hot gas, and a heat exchanger connected to said flues.

11. In a device of the class described, a heating chamber, mixing chambers at the respective opposite ends thereof, a receiving chamber, flues connecting the respective opposite ends of the receiving chamber to the respective mixing chambers, means for supplying addition hot gas to the respective mixing chambers, outlet flues communicating with the respective mixing chambers and heat exchangers connected to the said outlet flues.

12. In a device of the class described a heating chamber, mixing chambers connected to the respective opposite ends of said heating chambers, means for supplying hot gases to the mixing chamber, a receiving chamber, connections from the respective opposite ends thereof to the respective mixing chambers, means in the receiving chamber for forcing the contents thereof alternately to the respective mixing chambers, outlet flues from the respective opposite ends of the heating chamber valves controlling said outlet flues, and means for reversing said valves with said piston.

13. In a device of the class described a heating chamber, mixing chambers connected to the respective opposite ends of the heating chamber, means for supplying hot gases to the mixing chambers, a receiving chamber, flues connecting the opposite ends of the latter to the respective mixing chambers, a piston reciprocating in the receiving chamber, flues for permitting the exit of a small amount of gases from the respective mixing chambers, a heat exchanger connected to each flue, branch flues from the respective heat exchangers for leading away therefrom products of combustion, valves in said flues and means for reversing said valves with the reversal of the piston.

14. In a device of the class described, a heating chamber, a receiving chamber, a connection from the receiving chamber to the heating chamber, a piston in the receiving chamber adapted when reciprocated to force gases from the receiving chamber to the heating chamber, a flue for leading a portion of the gases from the heating chamber after they have been substantially cooled therein and means for returning a portion of said gases to the receiving chamber adjacent the piston to prevent over-heating of the latter.

15. In a device of the class described, a heating chamber, mixing chambers at opposite ends thereof, means for supplying hot gases thereto, a receiver connected at its opposite ends to the mixing chambers, a piston reciprocating in said receiver, flues connected to the respective mixing chambers for leading a portion of the spent gases therefrom, pipes for leading a portion of said spent gases to the receiver and valves controlling said pipes and operated in unison with the piston.

16. In a device of the class described, a heating chamber, mixing chambers at the respective opposite ends thereof, distributor flues extending through the mixing chambers and opening thereinto, means for supplying the distributing flues with hot gases, a receiver, means for forcing gas from said receiver to the respective mixing chambers and flues for leading away a portion of the heating gases.

17. In a device of the class described, a heating chamber, mixing chambers at the respective opposite ends thereof, means for flowing heating gases through said mixing chambers and said heating chamber, distributor flues arranged in the path of said gases in the mixing chamber and communicating with the latter and means for supplying said distributing flues with hot gases.

18. In a device of the class described a heating chamber, mixing chambers at the respective opposite ends thereof, vertical flues extending substantially across said mixing chambers and having series of openings communicating therewith and means for graduating the extent of said openings.

19. In a device of the class described, a heating chamber, mixing chambers at the respective opposite ends of the heating chamber, flues extending into said mixing chambers and communicating therewith, means for supplying said flues with hot products of combustion, a perforated diaphragm arranged intermediate said flues and the heating chamber for screening the latter from direct radiation.

20. In a device of the class described a heating chamber, mixing chambers at the respective opposite ends thereof and communicating therewith, distributing flues in said mixing chambers, means for causing heating gases to flow through said mixing chambers and said heating chamber, means for supplying the distributing flues with hot gases and outlet flues communicating with the mixing chambers intermediate the distributing flues and the heating chamber.

21. In a device of the class described, a heating chamber, a receiving chamber, flues connecting the respective opposite ends of the receiving chamber with the ends of the heating chamber, a piston in the receiving chamber, means for operating the piston, means for supplying an increment of hot gases to the device, and means operated by the piston operating means controlling the supply of fresh hot gases.

22. In a device of the class described, a heating chamber, mixing chambers at the respective opposite ends thereof communicating therewith, a combustion chamber for each mixing chamber, a flue extending from each combustion chamber and having openings communicating with the mixing chamber, means for controlling said openings, outlet flues communicating with the respective mixing chambers, valves in said flues, a receiving chamber, flues connecting the respective ends of said receiving chamber with the respective mixing chambers, a piston reciprocating in said receiving chamber, and means for reversing the valves with the reversal of movement of the piston.

23. In a device of the class described, a heating chamber, a receiving chamber of approximately the capacity of said heating chamber, connections from said receiving chamber to the respective opposite ends of the heating chamber, and means in the receiving chamber for expelling the contents thereof and forcing them alternately to the respective opposite ends of the heating chamber.

24. In a device of the class described, a heating chamber, a receiving chamber of approximately the capacity of heating chamber, connections from said receiving chamber to the respective opposite ends of the heating chamber, and means in the receiving chamber for forcing the contents thereof alternately into the opposite ends of the heating chamber and means intermediate the receiver and heating chamber for heating the gases.

25. In a device of the class described, a heating chamber, a receiving chamber of approximately the capacity of the heating chamber, flues connecting the respective opposite ends of the receiving chamber to the respective opposite ends of the heating chamber, said flues of substantially less capacity than the heating chamber or receiver, means in the receiving chamber for displacing gases therefrom alternately through the opposite flues into the heating chamber and means for heating the gases.

26. In a device of the class described, a heating chamber, mixing chambers arranged at the respective opposite ends thereof, combustion chambers in advance of and communicating with the intake sides of the respective mixing chambers, and outlet flues directly communicating with the respective ends of the heating chamber.

27. In heating apparatus, a heating chamber, a receiving chamber, connections between the heating chamber and receiving chamber, reciprocating means in the latter for displacing gases therefrom and forcing them into the heating chamber, a combustion chamber communicating with the heating chamber and an outlet flue also communicating with the heating chamber.

28. In a heating apparatus, a heating chamber, a receiving chamber, connections between the heating chamber and receiving chamber, movable means in the latter for displacing gases therefrom and forcing them alternately in opposite directions through the heating chamber, a combustion chamber communicating with the connection and an outlet flue connected to the heating chamber on that side of it which is opposed to the combustion chamber.

29. In a device of the class described, a heating chamber, means for pulsating gases back and forth through the heating chamber, means at the respective opposite ends of the heating chamber for adding hot gases to the reciprocated gases, and means located between the means for adding hot gases for releasing a portion of the used gases.

30. In a device of the class described, a heating chamber, mixing chambers at the respective opposite ends thereof, means connected to said mixing chambers for forcing gases alternately from one mixing chamber to the other through the heating chamber in rapid succession, means in the mixing chambers for supplying fresh gases thereto, and means for releasing a portion of the gases from the space intermediate said mixing chambers.

31. Heating apparatus comprising a heating chamber, a receiving chamber for hot gases to be supplied to the heating chamber and communicating with the opposite sides of the heating chamber, and means for creating quick pulsations of hot gases back and forth through said heating chamber, comprising a cooled and insulated reciprocating member having direct contact with said hot gases.

32. Heating apparatus comprising a heating chamber, a receiving chamber for hot gases to be supplied to the heating chamber, the opposite side of said receiving chamber having communication with the respective ends of the heating chamber, and means for creating quick pulsations of hot gases back and forth through the heating chamber, comprising a fluid-cooled reciprocating device disposed in said receiving chamber, and having direct contact with the hot gases.

FRANZ PUENING.